Aug. 1, 1961 A. G. EICKMEYER 2,994,588
PROCESS FOR PRODUCTION OF SULPHUR FROM SOUR GAS
Filed Oct. 9, 1958 2 Sheets-Sheet 1
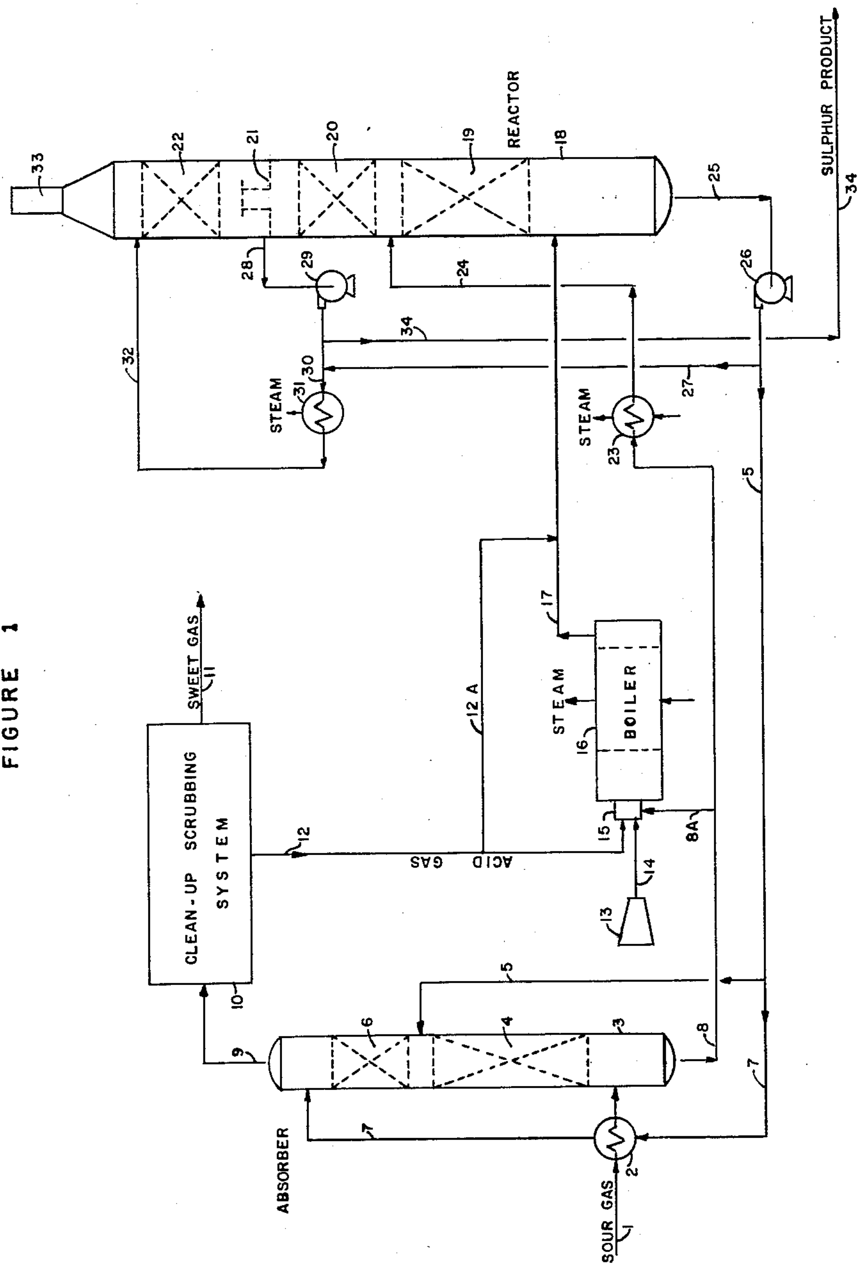
INVENTOR.
A. G. EICKMEYER PROCESS FOR PRODUCTION OF SULPHUR FROM SOUR GAS
Filed Oct. 9, 1958 2 Sheets-Sheet 2
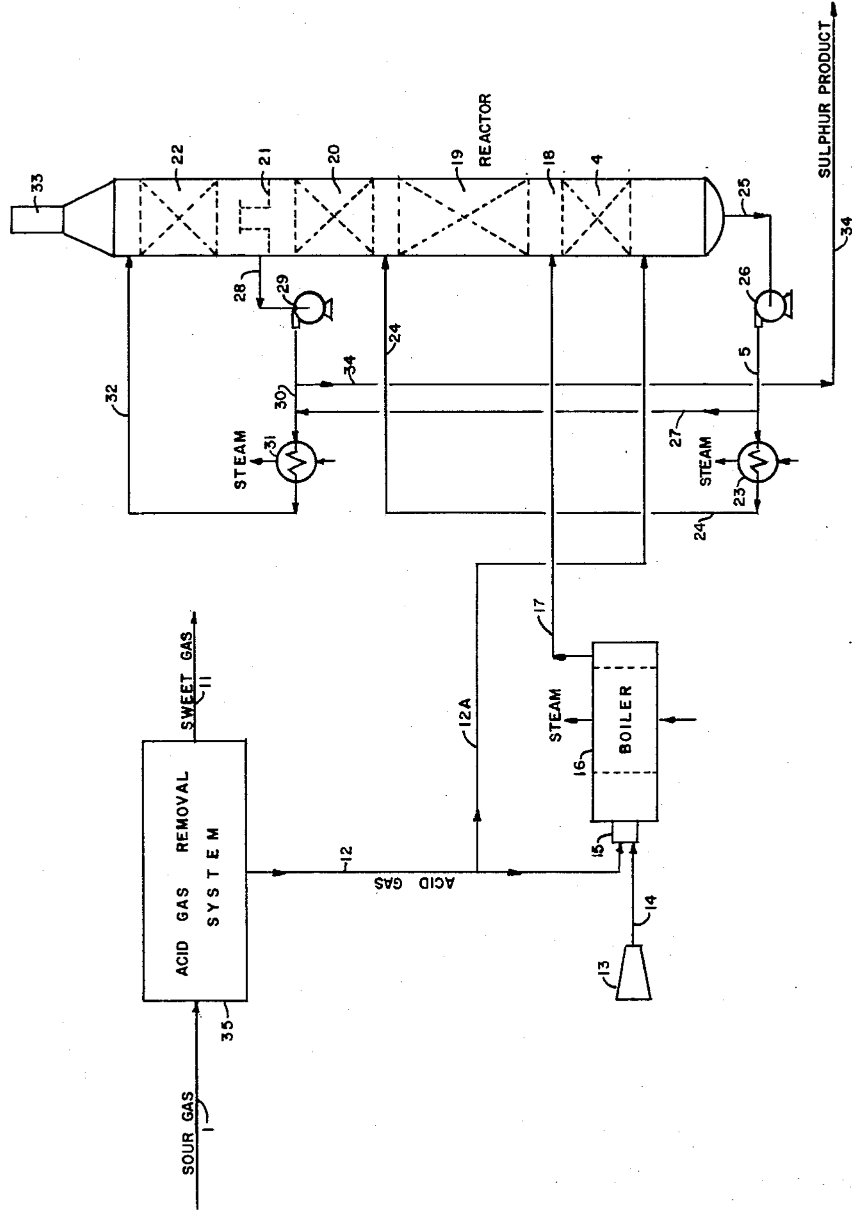
INVENTOR.
A. G. EICKMEYER United States Patent Office 2,994,588 Patented Aug. 1, 1961

2,994,588

PROCESS FOR PRODUCTION OF SULPHUR FROM SOUR GAS

Allen G. Eickmeyer, 7204 Cherokee Drive, Prairie Village, Kans.

Filed Oct. 9, 1958, Ser. No. 766,301
10 Claims. (Cl. 23—225)

This invention relates to improvements in methods for the production of elemental sulphur from a gas containing hydrogen sulphide such as sour natural gas or an acid gas mixture containing hydrogen sulphide and carbon dioxide. More particularly the invention relates to a more direct process for the recovery of sulphur by the absorption of hydrogen sulphide and the reaction of hydrogen sulphide with an oxygen bearing gas in the presence of a cyclic stream of molten sulphur.

In conventional practice, elemental sulphur is recovered from sour gas by first removing the acid gases, hydrogen sulphide and carbon dioxide, from the gas by means of absorption in and stripping from a circulating solution of a weakly alkaline material, most commonly monoethanolamine. The hydrogen sulphide is then converted to elemental sulphur in a more or less conventional Claus plant, wherein a third of the hydrogen sulphide is burned with air to generate by-product steam, and the resulting $SO_2$ is reacted with the remaining $H_2S$ over a catalyst to produce elemental sulphur vapor and water vapor. The sulphur vapor is then recovered by condensation, either in a tubular condenser followed by a separator or in a sulphur scrubbing tower providing direct contact with a recirculated stream of liquid sulphur at a temperature of about 270 to 300 degrees F.

The sulphur-producing reaction is highly exothermic, causing a 200 or 300 degree rise in temperature across the catalyst bed. Since the reaction is incomplete, especially at high temperatures, two or more stages of conversion are commonly used, with recovery of sulphur after each stage of reaction, in order to obtain a high yield of sulphur. The exhaust gases are vented to the atmosphere and the process is performed at substantially atmospheric pressure with pressure enough for the frictional losses through the equipment. These factors make for a series of large and cumbersome pieces of equipment and interconnecting pipelines and, therefore, a high investment cost. Furthermore, the amine plant is even more costly and more steam is required for regeneration of the solution than the by-product steam available from the sulphur plant.

Direct sulphur processes have been proposed which would recover elemental sulphur from sour natural gas by partial combustion of the contained hydrogen sulphide with air. However, these methods have not met with favor because of contamination of the residual gas with nitrogen, which renders the gas unsaleable due to a low heating value.

An object of this invention is to obtain a high yield of sulphur from a process in which the sulphur-producing reaction and recovery steps can be housed in a single vessel.

Another object of this invention is to combine hydrogen sulphide absorbtion and reaction steps into a relatively simple cyclic system for the production of elemental sulphur from sour gas.

A further object of the invention is to provide a more direct process for the recovery of sulphur from sour natural gas without degrading the residual gas by contamination with nitrogen.

My invention revolves around the cyclic use of liquid sulphur as an absorbent for hydrogen sulphide, a reaction coolant, and a sulphur recovering agent. The solubility of hydrogen sulphide in liquid sulphur behaves abnormally from other gases in liquids, particularly with respect to temperature and the extent of solubility. I have found that hydrogen sulphide gas under pressure is quite soluble in liquid sulphur at a temperature of 300 degrees F., and that the solubility increases with temperature up to about 400 degrees F., and then remains substantially constant between 400 and 700 degrees F., which was the highest temperature investigated. For example, in this temperature range a gallon of sulphur will dissolve one standard cubic foot of hydrogen sulphide when the partial pressure of this gas is 80 pounds per square inch. The solubility increases with pressure, but not in direct proportion. Other gases, such as methane and carbon dioxide, behave normally and are only very slightly soluble in sulphur.

Pure liquid sulphur is a complex mixture of polymers including eight-membered rings and sulphur chains. As the temperature is raised, especially between 300 and 400 degrees F., the rings break down and form long chain polymers. Also, if sulphur is pure, the viscosity undergoes a tremendous increase beginning at about 320 degrees F. The high solubility of hydrogen sulphide is believed to be due to a reaction with the chains to form hydrogen polysulphides. The increase of hydrogen sulphide solubility with temperature up to 400 degrees F. is apparently due to the increasing preponderance of chains. An important related fact is that the presence of hydrogen sulphide practically eliminates the large viscosity increase experienced with pure sulphur between 320 degrees and 500 degrees F. These facts render it practical to use liquid sulphur as a hydrogen sulphide absorption medium and thence as a reaction temperature moderator in a temperature range where pure sulphur would be too viscous to handle by pumping. My invention involves circulating a stream of hot sulfur between a zone of contact with a hydrogen sulphide bearing gas and a reaction zone where elemental sulphur is produced.

The preferred embodiment of my process depends upon the hydrogen sulphide content and pressure of the sour gas. If both are high, the scheme shown in FIGURE 1 of the drawings is more likely to result in lower total investment and operating costs. On the other hand, if the partial pressure of $H_2S$ is low, the arrangement of FIGURE 2 is preferred.

With a very sour gas at high pressure, as much as 90–95% of the hydrogen sulphide can be removed by contact with sulphur. If necessary in order to meet pipeline specifications, the remaining hydrogen sulphide would be removed from the gas by a clean-up scrubbing system of conventional design, employing an alkaline scrubbing medium, such a a solution of monoethanolamine or potassium carbonate. The clean-up system is similar to the scrubbing systems commonly used for treating sour gas except that it is now much smaller and less costly, and much less steam is required. The acid gas stream recovered by regenerating the alkaline solution, is sent to the sulphur recovery system, usually entering the burner of a steam-generating boiler as described hereinafter.

Referring to FIGURE 1, sour gas under pressure enters through line 1 and passes through gas preheater 2 before entering absorber 3. In the absorber, the ascending gas is contacted by a counter-current stream of hot sulphur at 400 to 650 degrees F. in packed bed 4 or other suitable contact means such as bubble trays. Herein, much of the hydrogen sulphide contained in the sour gas is absorbed and dissolved, and rich sulphur leaves the absorber through line 8. Most of the sulphur enters the absorber through line 5 and is distributed uniformly over packed bed 4. The gas leaving the top of bed 4 is saturated with sulphur vapor at the ambient temperature.

This gas then passes upward through packed bed 6 where the sulphur vapor losses are reduced to a negligible value by condensation and contact with a stream of sulphur entering the top of the absorber through line 7 after being cooled to 270 degrees F. by heat exchange in gas preheater 2. The residual gas leaves the top of the absorber through line 9.

In order to remove hydrogen sulphide down to an acceptable level for transmission pipelines, the gas in line 9 is further treated by conventional means in clean-up scrubbing system 10 (not detailed) to produce sweet gas in line 11 and, by regeneration of the scrubbing solution, an acid gas stream in line 12. This stream contains the remaining $H_2S$ and also any $CO_2$ present in the original sour gas in line 1.

The acid gas in line 12 is burned by combustion air supplied by blower 13 through line 14 to burner 15 of waste heat boiler 16, which generates steam at a pressure of about 200 p.s.i.g. The steam is used for turbine drivers (not shown) and other process purposes. The air required to convert hydrogen sulphide to elemental sulphur is the same as that required to burn ⅓ of hydrogen sulphide completely to water vapor and sulphur dioxide. The air should be controlled closely, but the fuel to the burner does not require precise control. However, in the event that the hydrogen sulphide contained in acid gas line 12 is substantially less than ⅓ of the total hydrogen sulphide in the original sour gas in line 1, the oxygen in the combustion air may be completely burned out by supplying a small stream of rich sulphur from line 8 through line 8*a* to the burner 15. Alternately, a flash drum (not shown) could be installed on line 8, and flashed hydrogen sulphide gas, resulting from lowering the pressure of the sulphur, would be conducted through line 8*a* to the burner 15. On the other hand, in the event that poor combustion would result in burner 15 from an excessive $CO_2$ content in line 12, or from the quantity of hydrogen sulphide greatly exceeding ⅓ of the total, a part or all of the acid gas in line 12 may be caused to bypass the boiler through line 12*a*, to join the boiler flue gas in line 17, which enters the bottom of the reactor 18.

Reactor 18 contains catalyst beds 19 and 20, a chimney tray 21 and a packed bed 22. The catalyst in beds 19 and 20 may be in the form of irregular particles, but it is preferably a shaped catalyst, having a form such as Raschig rings. The temperature of the rich sulphur in line 8 is lowered slightly by generation of steam in sulphur cooler 23 and the sulphur is sent through line 24 to enter reactor 18 for distribution over the catalyst bed 19. In catalyst bed 19, sulphur dioxide and any residual oxygen contained in the combustion gases react with hydrogen sulphide to form elemental sulphur and water vapor. In this case much of the hydrogen sulphide is carried to the reaction zone by the stream of hot sulphur. The reaction is exothermic but the presence of the circulating sulphur suppresses the temperature rise, thus giving a favorable condition for a more complete reaction. It is preferred to maintain the temperature of the sulphur within a range of 425 to 500 degrees F. However, a wider latitude in temperature such as 400 to 650 degrees, is feasible. Sulphur, having a sufficient residual hydrogen sulphide content to give good fluidity, collects at the bottom of reactor 18 and is recirculated through line 25, pump 26 and lines 5 and 7 to the absorber 3 as described before. Much of the sulphur produced is recovered directly in catalyst bed 19 and that portion is sent through line 27 to be cooled and swept clean of hydrogen sulphide in the upper sulphur circuit before being withdrawn as product through line 34.

Referring again to reactor 18, catalyst bed 19 may be divided into two or more beds with sulphur injection between beds for better control. The gases leaving the top of catalyst bed 19, pass through dry catalyst bed 20, where the sulphur producing reaction is completed. Even though catalyst bed 20 is not cooled, the temperature rise due to reaction is not great because the bulk of the reaction has already taken place in catalyst bed 19. The dry catalyst bed 20 is not essential to the operability of the process but is preferred in order to insure completeness of the reaction.

The gases leaving catalyst bed 20, pass up through chimney tray 21 and are cooled to about 270 degrees F. in packed bed 22 by contact with the recirculated stream of sulphur entering at the top of the reactor through line 32. In this way the remaining sulphur vapor is recovered by condensation before the waste gas, which is mainly nitrogen and water vapor, is vented through stack line 33. The sulphur, which enters through line 32 at a temperature of about 270 degrees F., is warmed to about 300 degrees F. in passing down through packed bed 22, after which it accumulates on chimney tray 21. The sulphur is withdrawn through line 28 and recirculated by pump 29 through line 30 to sulphur cooler 31, which serves to generate low pressure steam. Alternately this heat may be wasted to cooling water. The sulphur, having been cooled back down to 270 degrees F., passes through line 32 to the top of packed bed 22. The net sulphur produced in the system is withdrawn from line 30 through sulphur product line 34 and sent to storage.

Referring now to FIGURE 2, where similar items bear the same reference numbers as in FIGURE 1, this scheme is preferred where the sour gas treating pressure is low or where the hydrogen sulphide content is low, thus giving a low partial pressure. In this case, the sour gas in line 1 is sent directly to a conventional acid gas removal system 35 (not detailed) in order to prepare the acid gas stream 12 which contains all the hydrogen sulphide plus any $CO_2$ present in the original sour gas. A portion of the acid gas is sent to burner 15 of the boiler and the balance is sent through line 12*a* to the base of the reactor 18. Herein the acid gas passes upward through packed bed 4 where it contacts the sulphur descending from catalyst bed 19. In bed 4 the recirculating sulphur becomes resaturated with hydrogen sulphide which lowers the viscosity making it fluid enough to be handled by recirculating pump 26. Since packed bed 4 in reactor 18 is at low pressure, the hydrogen sulphide content of the sulphur is not very high. Most of the $H_2S$ in the acid gas passes up through bed 4 without being absorbed and mixes with combustion flue gases coming from line 17 and entering catalyst bed 19. Otherwise the system is similar to FIGURE 1 except that there is no sulphur wash absorber for the sour gas. The sulphur in line 5 leads from the pump 26 directly to the sulphur cooler 23 and thence through line 24 to the reactor where the sulphur is circulated over catalyst bed 19. Here it serves to moderate the temperature in the sulphur-producing reaction zone as described before.

It should be noted that many details of the arrangement shown in the drawings may be changed without departing from the spirit and the scope of the invention. For example, the waste heat boiler 16 could be eliminated and the combustion air in line 14 or the hot combustion gases from burner 15 could be sent directly to the reactor. In either case the heat of combustion would also be absorbed by the recirculating sulphur which would add to the duty of sulphur cooler 23. Also, sulphur cooler 23 may be placed elsewhere in the circuit or cooling tubes may be inserted in the bottom of the reactor 18 so as to be submerged in the pool of accumulating sulphur. Furthermore, the beds of reactor 18 may be housed in separate vessels or, if desired, the arrangement of the beds could be inverted with concurrent downward flow of both gases and sulphur. Moreover, packed bed 22 and the sulphur circuit handled by pump 29 may be replaced by a tubular sulphur condenser of the type used in many sulphur plants. In still another modification, in order to reduce equipment size of a large plant, the reactor may be operated under pressure by holding a back pressure on vent line 33 or by sending the vent gases through a turbine before discharging to the atmosphere. The turbine could assist in driving the air blower 13.

The essential novelty of the invention lies in the maintenance of a recirculated stream of hot sulphur in good fluid condition by absorption of hydrogen sulphide and the use of fluid sulphur as a temperature-controlling agent in a sulphur-producing reaction zone. In the reaction zone hydrogen sulphide is reacted with an oxygen-bearing gas, such as sulphur dioxide or oxygen, to produce elemental sulphur and water vapor.

What I claim is:

1. A process for production of sulphur from sour gas containing hydrogen sulphide comprising circulating a stream of hot molten sulphur through a zone of contact with said sour gas, thereby absorbing hydrogen sulphide, and through a reaction zone for contact and reaction of hydrogen sulphide with sulphur dioxide, thereby producing elemental sulphur and water vapor.

2. A process for production of sulphur from acid gas containing hydrogen sulphide comprising circulating a stream of hot molten sulphur through a zone of contact with said acid gas, thereby absorbing hydrogen sulphide, and through a reaction zone for contact and reaction of hydrogen sulphide with sulphur dioxide, thereby producing elemental sulphur and water vapor.

3. In a process for producing elemental sulphur by reaction of hydrogen sulphide and an oxygen-bearing gas in a reaction zone, the improvement comprising circulating a stream of hot, molten sulphur through a zone of contact with hydrogen sulphide, thereby absorbing hydrogen sulphide, and through said reaction zone, thereby controlling said reaction temperature.

4. In a process for producing elemental sulphur by reaction of hydrogen sulphide and an oxygen bearing gas in a reaction zone, the improvement comprising circulating a stream of hot, molten sulphur through a zone of contact with hydrogen sulphide, thereby absorbing hydrogen sulphide, and through said reaction zone, thereby controlling said reaction temperature, and maintaining the temperature of said circulating stream of sulphur within the range of 400 to 650 degrees F.

5. In a process for producing elemental sulphur by reaction of hydrogen sulphide and an oxygen bearing gas in a reaction zone, the improvement comprising circulating a stream of hot molten sulphur through a zone of contact with hydrogen sulphide, thereby absorbing hydrogen sulphide, and through said reaction zone, thereby controlling said reaction temperature, and maintaining the temperature of said circulating stream of sulphur within the range of 425 to 500 degrees F.

6. In a process for producting elemental sulphur from sour gas by separation of hydrogen sulphide from said sour gas and reaction of hydrogen sulphide with an oxygen bearing gas in a reaction zone, the improvement comprising circulating a stream of hot molten sulphur through a zone of contact with said sour gas, thereby absorbing hydrogen sulphide, and through said reaction zone, thereby converting hydrogen sulphide to sulphur and water vapor under controlled temperature conditions.

7. In a process for producing elemental sulphur from sour gas by separation of hydrogen sulphide from said sour gas and reaction of hydrogen sulphide with an oxygen bearing gas in a reaction zone, the improvement comprising circulating a stream of hot molten sulphur through a zone of contact with said sour gas, thereby absorbing hydrogen sulphide, and through said reaction zone, thereby converting hydrogen sulphide to sulphur and water vapor, and maintaining the temperature of said circulating stream of sulphur within the range of 400 to 650 degrees F.

8. In a process for producing elemental sulphur from sour gas by separation of hydrogen sulphide from said sour gas and reaction of hydrogen sulphide with an oxygen bearing gas in a reaction zone, the improvement comprising circulating a stream of hot molten sulphur through a zone of contact with said sour gas, thereby absorbing hydrogen sulphide, and through said reaction zone, thereby converting hydrogen sulphide to sulphur and water vapor, and maintaining the temperature of said circulating stream of sulphur within the range of 425 to 500 degrees F.

9. A process for production of sulphur from sour gas containing hydrogen sulphide comprising circulating a stream of hot, molten sulphur through a zone of contact with said sour gas, thereby absorbing hydrogen sulphide, and through a reaction zone for contact and reaction of hydrogen sulphide with oxygen, thereby producing elemental sulphur and water vapor.

10. A process for production of sulphur from acid gas containing hydrogen sulphide, comprising circulating a stream of hot, molten sulphur through a zone of contact with said acid gas, thereby absorbing hydrogen sulphide, and through a reaction zone for contact and reaction of hydrogen sulphide with oxygen, thereby producing sulphur and water vapor.

References Cited in the file of this patent

UNITED STATES PATENTS

| | | |
|---|---|---|
| 2,107,907 | Rosenstein | Feb. 8, 1938 |
| 2,169,261 | Lee et al. | Aug. 15, 1939 |
| 2,666,690 | Folkins et al. | Jan. 19, 1954 |
| 2,881,047 | Townsend | Apr. 7, 1959 |